United States Patent
Nozawa

(10) Patent No.: US 11,192,456 B2
(45) Date of Patent: Dec. 7, 2021

(54) POWER SUPPLY SYSTEM FOR ELECTRIC VEHICLE

(71) Applicant: TOYOTA JIDOSHA KABUSHIKI KAISHA, Toyota (JP)

(72) Inventor: Takashi Nozawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/924,703

(22) Filed: Jul. 9, 2020

(65) Prior Publication Data
US 2021/0039507 A1 Feb. 11, 2021

(30) Foreign Application Priority Data
Aug. 9, 2019 (JP) .............................. JP2019-147743

(51) Int. Cl.
*B60L 50/51* (2019.01)

(52) U.S. Cl.
CPC ........... *B60L 50/51* (2019.02); *B60L 2210/40* (2013.01)

(58) Field of Classification Search
CPC ...... B60L 50/51; B60L 2210/40; B60L 50/60; B60L 58/10; B60L 53/22; B60L 53/24; B60L 15/007; B60L 2210/42; B60L 53/122; B60L 53/10; B60L 53/12; B60L 50/66; B60L 53/36; B60L 58/20; B60L 53/13; Y02T 90/14; Y02T 10/7072; Y02T 10/70; H02J 7/025; H02J 2207/20; H02J 7/345; H02J 9/061; H02J 7/0063; H02M 1/36; H02M 3/158; H02M 3/156; H02M 3/1582; H02M 1/08

See application file for complete search history.

(56) References Cited

U.S. PATENT DOCUMENTS

2017/0113567 A1* 4/2017 Koketsu ................. B60L 58/20

FOREIGN PATENT DOCUMENTS

| JP | 2017-085869 A | 5/2017 |
| JP | 2017-229108 A | 12/2017 |
| JP | 2019-088098 A | 6/2019 |

\* cited by examiner

*Primary Examiner* — John W Poos
*Assistant Examiner* — Alex W Lam
(74) *Attorney, Agent, or Firm* — Oliff PLC

(57) ABSTRACT

A power supply system disclosed herein may include: a first voltage sensor measuring voltage of a main power source; a power converter connected to a main power source through a relay; a voltage converter; and a controller. The power converter includes a capacitor connected to the main power source and a second voltage sensor measuring voltage of the capacitor. The controller precharges the capacitor with the voltage converter before closing the relay. The controller may be configured to: set target voltage by a measurement value of the first voltage sensor; acquire the measurement value of the first voltage sensor again as verification voltage when a difference between the target voltage and control voltage which is a measurement value measured by the third voltage sensor has fallen within a predetermined tolerance; and close the relay if a difference between the control voltage and the verification voltage is within the tolerance.

3 Claims, 3 Drawing Sheets

POWER SUPPLY SYSTEM FOR ELECTRIC VEHICLE

CROSS-REFERENCE TO RELATED APPLICATION

This application claims priority to Japanese Patent Application No. 2019-147743 filed on Aug. 9, 2019, the contents of which are hereby incorporated by reference into the present application.

TECHNICAL FIELD

The technology herein disclosed relates to a power supply system for an electric vehicle. The "electric vehicle" here includes a hybrid vehicle including both of an electric traction motor and an engine, and a vehicle in which a fuel cell is mounted as a power source for an electric traction motor. The term "a power supply system" means an electric power supply system and the term "a power source" means an electric power source in this description. The term "an electric traction motor" may be simply referred to as "a motor" in this description.

BACKGROUND

A power supply system included in an electric vehicle includes a main power source, and a power converter configured to convert power of the main power source into driving power for a traction motor. Each of Japanese Patent Application Publication Nos. 2019-088098 (Literature 1), 2017-229108 (Literature 2), and 2017-085869 (Literature 3) describes an example of such a power supply system. The power converter is connected to the main power source through a relay, and while a main switch of the vehicle is off, the relay is opened and the main power source is disconnected from equipment such as the power converter. The power converter includes a capacitor connected to the main power source. If the capacitor has a small amount of stored charge when the relay is closed, a large current could flow from the main power source to the capacitor. To prevent such flow of a large current into the capacitor, the power supply system in each of Literatures 1 to 3 charges the capacitor before closing the relay. Charging the capacitor in the power converter before closing the relay may herein be termed precharging.

The power supply system described in Literature 1 includes, in addition to the main power source, the relay, and the power converter which are described above, an auxiliary power source, a voltage converter, first to third voltage sensors, and a controller. An output voltage of the auxiliary power source is smaller than an output voltage of the main power source. The auxiliary power source is used to supply power to low-power electric devices. The first voltage sensor is configured to measure a voltage of the main power source. The second voltage sensor is configured to measure a voltage of the capacitor in the power converter (the capacitor connected to the main power source). The voltage converter is connected between the auxiliary power source and the capacitor, and can boost a voltage of the auxiliary power source and supply the same to the capacitor. The third voltage sensor is configured to measure a voltage of an output terminal of the voltage converter (i.e., an output voltage of the voltage converter). The controller is configured to, before closing the relay, drive the voltage converter and precharge the capacitor. The controller is configured to close the relay when a difference between a measurement value of the first voltage sensor (voltage of the main power source) and a measurement value of the third voltage sensor (output voltage of the voltage converter) has fallen within a predetermined tolerance. If an anomaly is occurring in the third voltage sensor, the controller is configured to close the relay when a difference between the measurement value of the first voltage sensor (voltage of the main power source) and a measurement value of the second voltage sensor (voltage of the capacitor) has fallen within the predetermined tolerance.

SUMMARY

When the technology in Literature 1 is adopted, there is a possibility where the voltage of the main power source could change during a while from when the difference between the measurement value of the first voltage sensor (voltage of the main power source) and the measurement value of the third voltage sensor (output voltage of the voltage converter) has fallen within the predetermined tolerance (i.e., after the precharging is completed) until the relay is closed. If the voltage of the main power source varies before the relay is closed, there is a possibility that a large current could flow in the capacitor when the relay is closed. Improvement in the technology in Literature 1 is thus desired.

A power supply system disclosed herein may comprise: a main power source; a first voltage sensor configured to measure a voltage of the main power source; an auxiliary power source an output voltage of which is smaller than an output voltage of the main power source; a relay connected to an output terminal of the main power source; a power converter comprising a capacitor connected to the main power source and a second voltage sensor configured to measure a voltage of the capacitor, the power converter being connected to the main power source through the relay; a voltage converter comprising a third voltage sensor configured to measure an output voltage of the voltage converter, the voltage converter being configured to charge the capacitor by boosting an output voltage of the auxiliary power source; and a controller. The controller may be configured to, before closing the relay: set a target voltage based on a measurement value of the first voltage sensor; control the voltage converter for a difference between the target voltage and a control voltage which is a measurement value measured by the second or third voltage sensor to fall within a predetermined tolerance; acquire the measurement value of the first voltage sensor again as a verification voltage when the difference has fallen within the predetermined tolerance; and close the relay if a difference between the control voltage and the verification voltage is within the predetermined tolerance.

In the power supply system herein disclosed, before the relay is closed, the measurement value of the first voltage sensor (the verification voltage), i.e., the voltage of the main power source is verified again. The controller thus does not close the relay in a slate where the difference between the voltage of the main power source (the verification voltage) and the voltage of the capacitor (the measurement value measured by the second or third voltage sensor (the control voltage)) has gone out from the tolerance. The technology herein disclosed is configured to reliably prevent a large current from flowing through the capacitor of the power converter when the relay is closed.

The controller may also be configured to maintain the voltage converter for the control voltage to match with the target voltage after the difference between the control voltage and the target voltage has fallen within the predetermined tolerance. The above-described process can prevent the difference between the voltage of the capacitor (the measurement value of the second voltage sensor) and the voltage of the main power source (the measurement value of the first voltage sensor) from falling out of the tolerance before the relay is closed.

The controller may also be configured to use the measurement value of the third voltage sensor as the control voltage. Since the third voltage sensor measures the output voltage of the voltage converter, the capacitor can be precharged at high speed and with high accuracy.

The details and further improvements of the technology herein disclosed will be described in "DETAILED DESCRIPTION" below.

DETAILED DESCRIPTION

Embodiment

Figure 1:
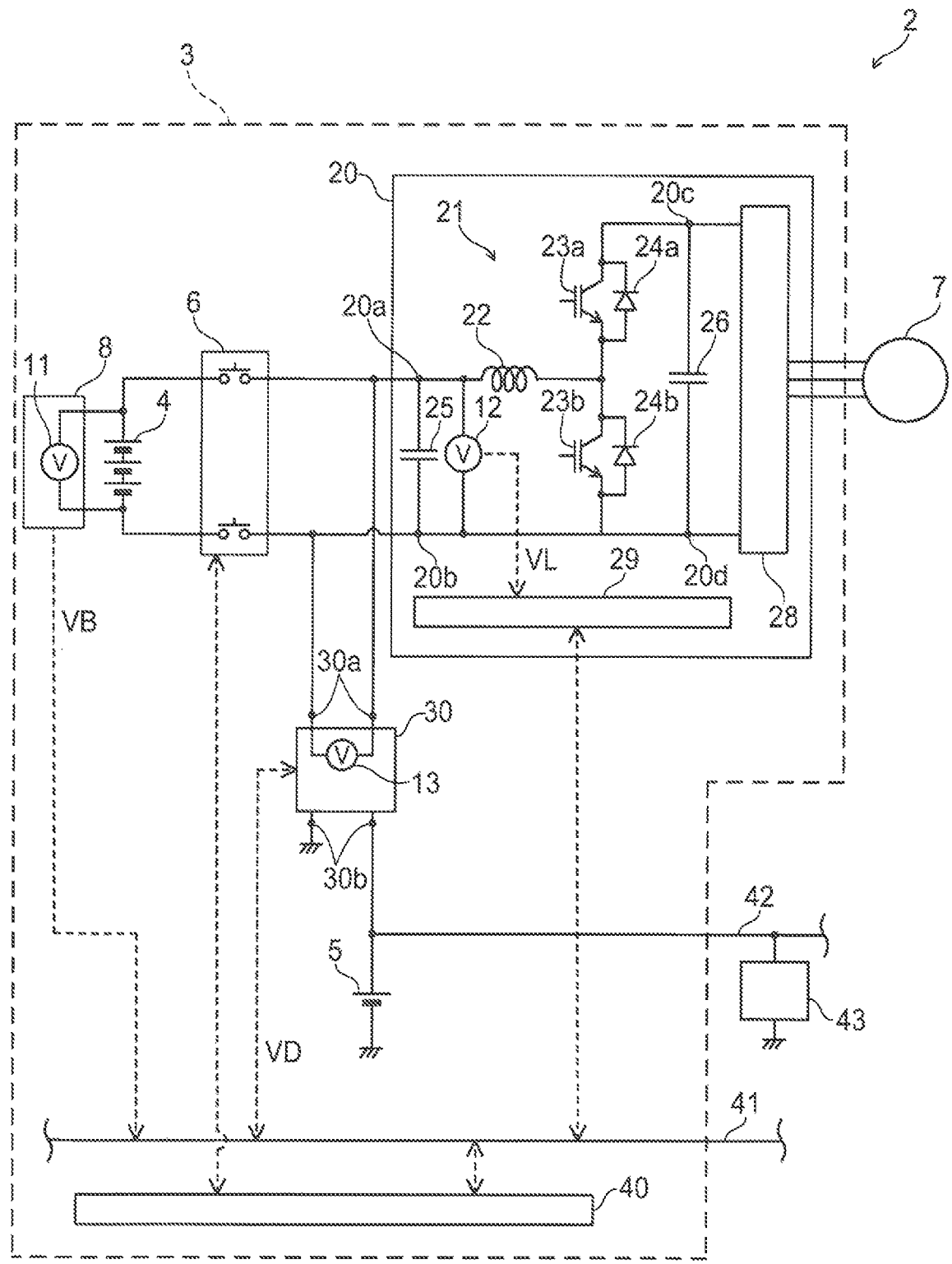
FIG. 1 is a block diagram of a power system of an electric vehicle comprising a power supply system according to an embodiment.

With reference to drawings, a power supply system 3 according to an embodiment will be described. The power supply system 3 is mounted in an electric vehicle 2. FIG. 1 shows a block diagram of a power system of the electric vehicle 2 comprising the power supply system 3. The electric vehicle 2 according to the embodiment includes an electric traction motor 7. Driving power is supplied from the power supply system 3 to the motor 7. A dashed arrow line in FIG. 1 represents a flow of a signal.

The power supply system 3 includes a main battery 4, a sub-battery 5, a system main relay 6, a power converter 20, a voltage converter 30, a battery controller 8, a vehicle controller 40, and voltage sensors 11, 12, 13.

The main battery 4 is a direct-current (DC) power source configured to store power for the motor 7, and has an output voltage of, for example, 200 volts. The main battery 4 is specifically a lithium-ion battery. The sub-battery 5 is a DC power source for low-power devices that uses power smaller than the driving power for the motor 7, and has an output voltage of, for example, 12 volts, which output voltage is smaller than the output voltage of the main battery 4. The sub-battery 5 is, for example, a lead-acid battery.

The main battery 4 is configured to be monitored by the battery controller 8 at all times. The battery controller 8 includes the voltage sensor 11 configured to measure the output voltage of the main battery 4. The voltage measured by the voltage sensor 11 is transmitted to the vehicle controller 40 through an intra-vehicle network 41. The vehicle controller 40 will be described later.

An output terminal of the main battery 4 is connected with the system main relay 6. The power converter 20 is connected to the main battery 4 through the system main relay 6. The power converter 20 is a device configured to convert output power of the main battery 4 into the driving power for the motor 7. The power converter 20 includes a voltage converter 21 and an inverter 28.

The voltage converter 21 includes a filter capacitor 25, a reactor 22, two switching elements 23a, 23b, and two diodes 24a, 24b. The voltage converter 21 is a bidirectional voltage converter that has a boosting function of boosting a voltage applied to low-voltage terminals 20a, 20b and outputting the boosted voltage from high-voltage terminals 20c, 20d, and a step-down function of stepping down a voltage applied to the high-voltage terminals 20c, 20d and outputting the stepped-down voltage from the low-voltage terminals 20a, 20b. The voltage converter 21 in FIG. 1 has a well-known circuit configuration and well-known functions, and hence the detailed description thereof will be omitted.

The inverter 28 is connected to the high-voltage terminals 20c, 20d of the voltage converter 21. The power converter 20 has a function of boosting the output power of the main battery 4, and furthermore converting the power from DC into alternating current (AC), and supplying the same to the motor 7. Specifically, the inverter 28 is configured to convert the DC power boosted by the voltage converter 21 into the AC power (the driving power for the motor 7). The power converter 20 further has a function of converting, power generated by the motor 7 back-driven at deceleration (regenerative power) from AC into DC, and further stepping down the DC power, and supplying the stepped-down DC power to the main battery 4.

The switching elements 23a, 23b of the voltage converter 21 and the inverter 28 are controlled by a motor controller 29. The motor controller 29 is configured to control the switching elements 23a, 23b and the inverter 28 in accordance with a command from the vehicle controller 40.

In the power converter 20, the filter capacitor 25 is connected between the low-voltage terminals 20a and 20b, and a smoothing capacitor 26 is connected between the high-voltage terminals 20c and 20d. The diode 24a is connected between the positive terminal 20a of the low-voltage terminals and the positive terminal 20c of the high-voltage terminals. The diode 24a allows passage of a current from the positive terminal 20a of the low-voltage terminals toward the positive terminal 20c of the high-voltage terminals. When the system main relay 6 is closed, therefore, the filter capacitor 25 and the smoothing capacitor 26 are connected to the main battery 4, by which the current of the main battery 4 flows into these capacitors. The filter capacitor 25 and the smoothing capacitor 26 may hereinafter be denoted collectively as capacitors 25, 26.

The power converter 20 includes the voltage sensor 12 configured to measure a voltage of the filter capacitor 25. A measurement value of the voltage sensor 12 is transmitted to the motor controller 29, and is further transmitted to the vehicle controller 40 through the intra-vehicle network 41. The vehicle controller 40 is configured to charge (precharge) the capacitors 25, 26 before closing the system main relay 6, which will be described in detail later. The vehicle controller 40 uses the measurement value of the voltage sensor 12 upon pre-charging.

The voltage converter 30 is connected to the low-voltage terminals 20a, 20b of the power converter 20. The voltage converter 30 is also a bidirectional voltage converter. The voltage converter 20 is connected to a high-voltage terminal 30a of the voltage converter 30. A low-voltage terminal 30b of the voltage converter 30 is connected to the sub-battery 5. The sub battery 5 is configured to have various auxiliaries connected thereto through a power line 42. The "auxiliaries" is a generic name for electric devices which operates with power supplied by the sub-battery 5, and an example of the auxiliaries is an automobile navigation system 43.

The voltage converter 30 is controlled by the vehicle controller 40. The vehicle controller 40 provides a command for the voltage converter 30 to perform a step-down operation when the voltage of the sub-battery 5 drops (i.e., when the amount of stored charge in the sub-battery 5 drops). Upon receipt of the command, the voltage converter 30 steps down the voltage of the main battery 4, and supplies the power with the stepped-down voltage to the sub-battery 5. In the precharging described above, the voltage converter 30 boosts the voltage of the sub-battery 5 and supplies the power with the boosted voltage to the capacitors 25, 26. When the voltage converter 30 performs a boosting operation, the high-voltage terminal 30a corresponds to its output terminal. In other words, the capacitors 25, 26 of the power converter 20 are connected to the output terminal (the high-voltage terminal 30a) of the voltage converter 30.

The voltage converter 30 includes the voltage sensor 13 configured to measure a voltage of the high-voltage terminal 30a. A measurement value of the voltage sensor 13 is also transmitted to the vehicle controller 40.

The vehicle controller 40, other controllers (the battery controller 8 and the motor controller 29), and the voltage converter 30 are configured to communicate with one another through the intra-vehicle network 41. The system main relay 6 is connected to the vehicle controller 40 by a dedicated communication line. The system main relay 6 is also controlled by the vehicle controller 40.

Precharging of the capacitors 25, 26 will be described. If the system main relay 6 is closed when each of the capacitors 25, 26 has a small amount of stored charge, a large current could flow from the main battery 4 to the capacitors 25, 26. Such large current may damage the capacitors 25, 26 and/or the system main relay 6. To suppress the damage to the capacitors 25, 26 and/or the system main relay 6, the vehicle controller 40 is configured to, before closing the system main relay 6, precharge the capacitors 25, 26 by using the sub-battery 5 and the voltage converter 30.

For convenience of description, the voltage sensor 11 configured to measure the voltage of the main battery 4 is denoted as a first voltage sensor 11, and a measurement value of the first voltage sensor 11 is denoted as a voltage VB. The voltage sensor 12 configured to measure the voltage of the capacitor 25 is denoted as a second voltage sensor 12, and a measurement value of the second voltage sensor is denoted as a voltage VL. The voltage sensor 13 configured to measure the voltage of the high-voltage terminal 30a of the voltage converter 30 is denoted as a third voltage sensor 13, and a measurement value of the third voltage sensor is denoted as a voltage VD.

Figure 2:
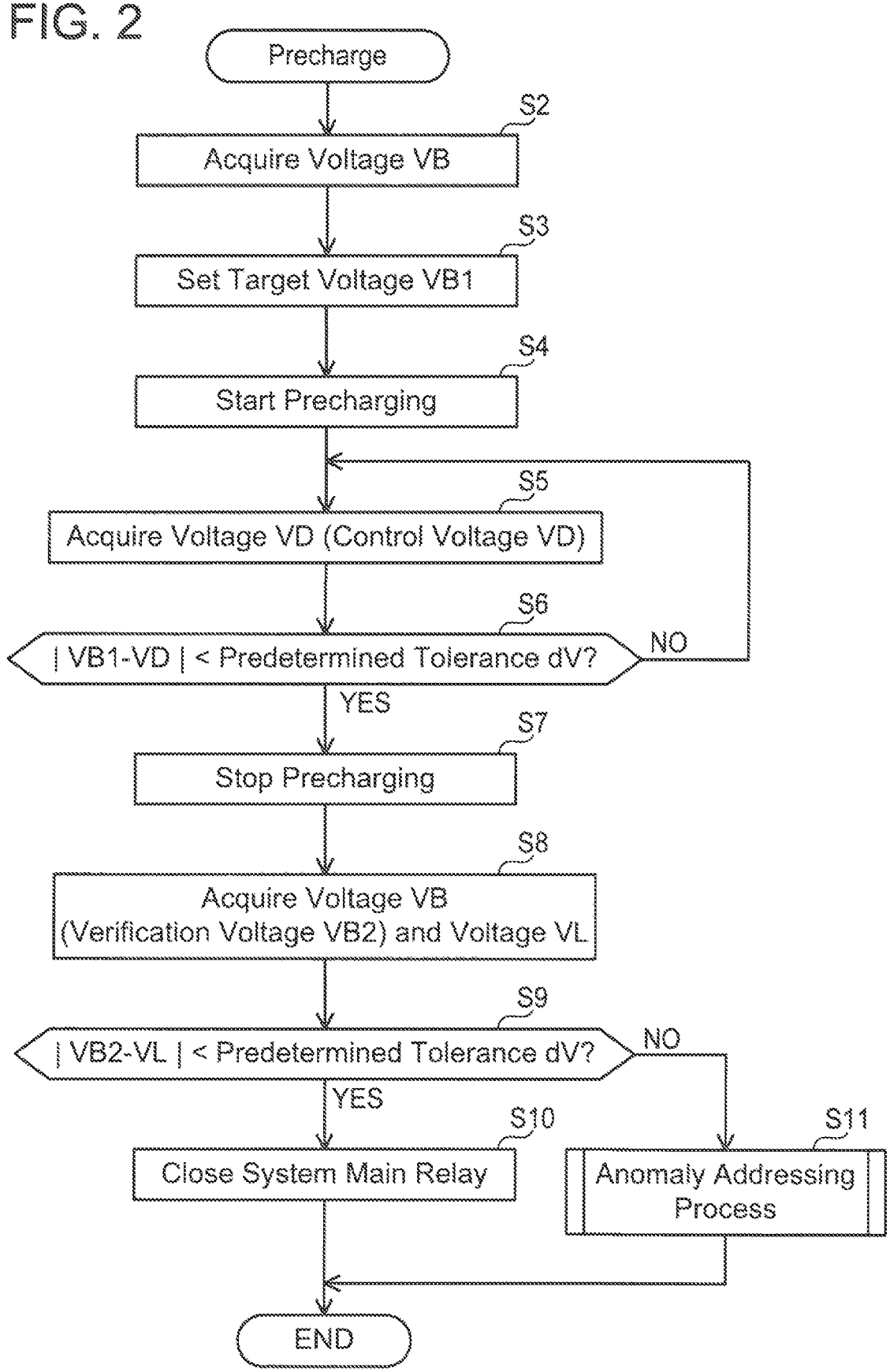
FIG. 2 is a flowchart of a precharging process performed by a controller.

FIG. 2 shows a flowchart of the precharging process. When a main switch of the vehicle is turned on, the vehicle controller 40 starts the process in FIG. 2. The vehicle controller 40 acquires the voltage VB from the first voltage sensor 11 (step S2). Based on the acquired voltage VB, the vehicle controller 40 sets a target voltage VB1 to be used in precharging of the capacitors 25, 26 (step S3). The target voltage VB1 is set to a value close to the acquired voltage VB. The target voltage VB1 may be a value equal to the acquired voltage VB, or may be a value obtained by adding a slight offset to the voltage VB (or a value obtained by subtracting a slight offset from the voltage VB).

Successively, the vehicle controller 40 causes the voltage converter 30 to start the boosting operation, and starts precharging (step S4).

The vehicle controller 40 acquires the measurement value of the third voltage sensor 13 (the voltage VD) (step S5), and the voltage VD acquired at step S5 is termed the control voltage VD. The vehicle controller 40 drives the voltage converter 30 until a difference between the control voltage VD and the target voltage VB1 has fallen within and below a predetermined tolerance dV (step S6: NO, S5). The tolerance dV is set to be a voltage difference (e.g., 20 volts) of a degree at which a large current does not flow into the capacitors 25, 26.

When the difference between the control voltage VD and the target voltage VB1 has fallen within the tolerance dV (step S6: YES), the vehicle controller 40 stops the precharging (step S7). In other words, the vehicle controller 40 stops the voltage converter 30.

When the difference between the control voltage VD and the target voltage VB1 has fallen within the tolerance dV, the vehicle controller 40 acquires the measurement value of the first voltage sensor 11 (the voltage VB) again and the measurement value of the second voltage sensor 12 (the voltage VL) (step S8). The voltage VB acquired at step S8 will be termed a verification voltage VB2, so as to be distinguished from the voltage VB acquired at another timing. The voltage VL corresponds to the voltage of the capacitors 25, 26 after the end of the precharging.

The vehicle controller 40 compares the verification voltage VB2 with the voltage VL (step S9). If a difference between the verification voltage VB2 and the voltage VL is within the tolerance dV, the vehicle controller 40 closes the system main relay 6 (step S10). In other words, the vehicle controller 40 connects the power converter 20 to the main battery 4. When the power converter 20 is connected to the main battery 4, the vehicle is ready to run. Moreover, if the sub-battery 5 has a low voltage (the sub battery 5 has a small amount of stored charge), the vehicle controller 40 commands the voltage converter 30 to perform the step-down operation, and charges the sub-battery 5 with power of the main battery 4.

On the other hand, if the difference between the verification voltage VB2 and the voltage VL is determined at step S9 to be out of the tolerance dV, it is highly likely some sort of anomaly is occurring. In this case, the vehicle controller 40 performs an anomaly addressing process without closing the system main relay 6 (step S9: NO, S11).

An example of the anomaly addressing process is as fellows. The vehicle controller 40 tunas on a warning light on an instrument panel. Moreover, the vehicle controller 40 stores a message (or an error code) indicative of an anomaly occurring in the power supply system 3 in a diagnostic memory. The diagnostic memory is a memory for a maintenance staff for the vehicle to refer to. The maintenance staff checks data in the diagnostic memory to obtain information with regards to the condition of the vehicle.

Advantages of the process in FIG. 2 will be described. After the precharging ends, the voltage of the capacitors 25, 26 (the voltage VL) could drop. Alternatively, the voltage of the main battery 4 (the voltage VB) could vary. If the voltage VL or VB varies after the precharging ends, a large current may flow into the capacitors 25, 26 when the system main relay 6 is closed. Alternatively, if an anomaly is taking place in the third voltage sensor 13, there is a possibility the measurement value of the third voltage sensor 13 (the voltage VD) may not be accurately representing the voltage of the capacitors 25, 26. In such a case as well, a large current may flow into the capacitors 25, 26 when the system main relay 6 has been closed. The process in FIG. 2 (the determination at step S9, in particular) enables the system main relay 6 to be closed in a state where it is ensured that the difference between the voltage VB of the main battery 4 and the voltage VL of the capacitor 25 is small (within the tolerance dV). Therefore, in the power supply system 3 according to the embodiment, no large current flows into the capacitors 25, 26 when the system main relay 6 is closed.

Figure 3:
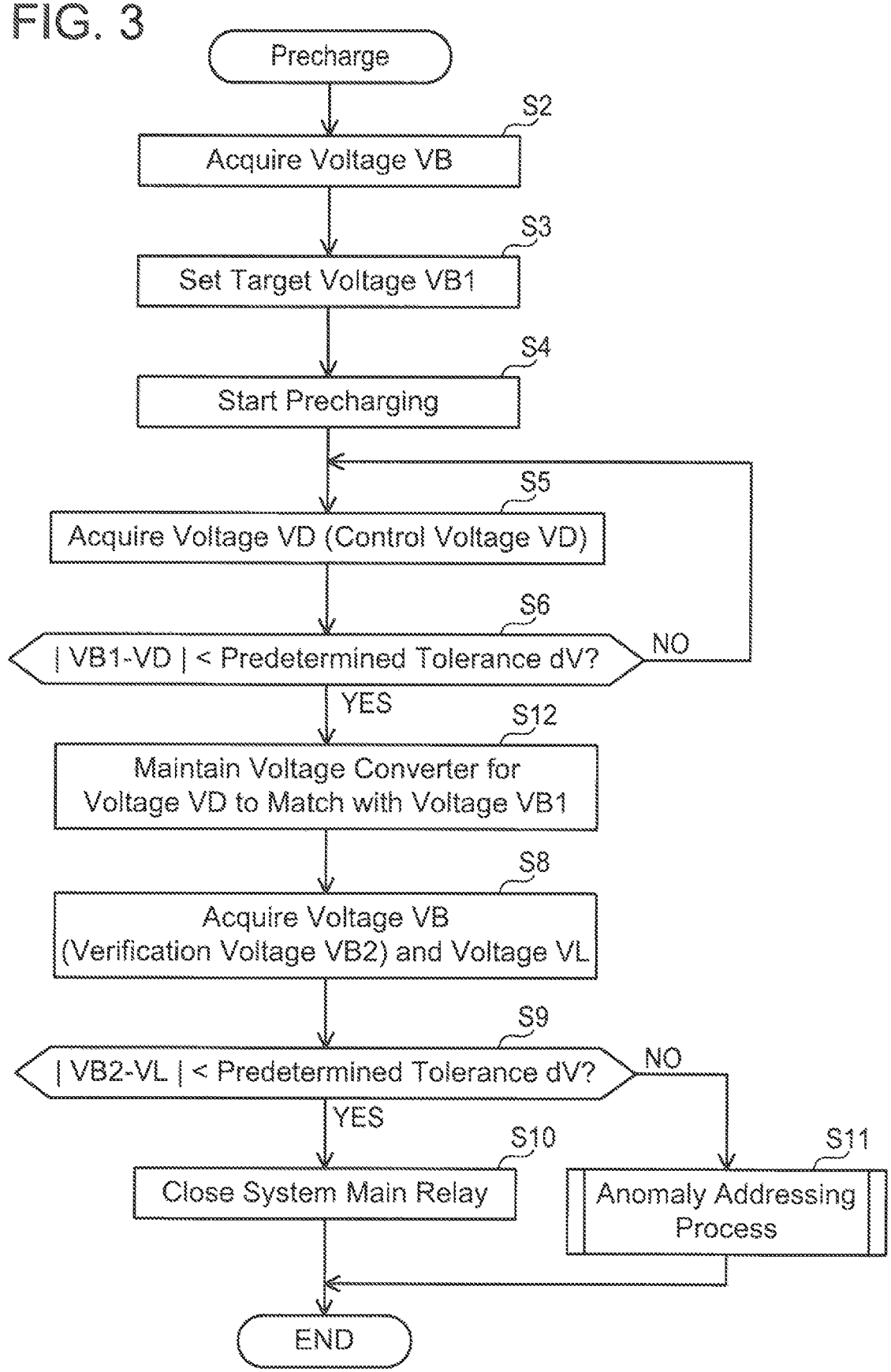
FIG. 3 is a flowchart of a variant of the precharging process.

FIG. 3 shows a variant of the precharging process. In FIG. 3, processes from steps S2 to S6 and processes from steps S8 to S11 are the same as to those in the flowchart of FIG. 2.

In the variant, processes after the difference between the control voltage VD and the target voltage VB1 has fallen within the tolerance dV differs from those in FIG. 2. After the difference between the control voltage VD and the target voltage VB1 has fallen within the tolerance dV (step S6: YES), the vehicle controller 40 maintains the voltage converter 30 for the control voltage VD to match the target voltage VB1 (step S12). Process after step S12 is equal to that according to the embodiment.

By the process of step S12, the control voltage VD is maintained at the target voltage VB1. Here, at step S12, the operation of the voltage converter 30 may be intermittent (repeatedly).

In this variant, the control voltage VD is maintained at the target voltage VB1. This process can prevent the difference between the voltage of the capacitors 25, 26 (the voltage VL) and the voltage of the main battery 4 (the voltage VB) from going out from the tolerance dV before the system main relay 6 is closed.

Points to be noted relating to the technology described in the embodiment will be mentioned. In the processes of steps S5, S6 in FIG. 2 or 3, the measurement value of the second voltage sensor 12 (the voltage VL) may be used as the control voltage instead of the measurement value of the third voltage sensor 13 (the voltage VD).

The vehicle controller 40 and other controller(s) may cooperate to implement the processes in FIG. 2 or 3. For example, the voltage converter 30 may also incorporate a controller therein, and this controller may perform the processes of steps S5, S6 in FIG. 2. The vehicle controller 40 may be a computer or CPU (Central Processing Unit) with storage storing a program for the processes in FIG. 2 or FIG. 3.

During the repetition of steps S5, S6, the target voltage VB1 may be modified. For example, the vehicle controller 40 may sometimes acquire the measurement value of the first voltage sensor 11 (the voltage VB) during the repetition of steps S5, S6, and may update the target voltage VB1 by using the newly-acquired voltage VB.

As mentioned above, the target voltage VB1 may be equal to the measurement value of the first voltage sensor 11 (the voltage VB), or may be a value obtained by adding a small offset to the voltage VB.

The main battery 4 corresponds to an example of a main power source. The main power source may be a fuel cell. The sub-battery 5 corresponds to an example of an auxiliary power source.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A power supply system for an electric vehicle, the system comprising:
    a main power source;
    a first voltage sensor configured to measure a voltage of the main power source;
    an auxiliary power source having an output voltage smaller than an output voltage of the main power source;
    a relay connected to an output terminal of the main power source;
    a power converter comprising a capacitor connected to the main power source and a second voltage sensor configured to measure a voltage of the capacitor, the power converter being connected to the main power source through the relay;
    a voltage converter comprising a third voltage sensor configured to measure an output voltage of the voltage converter, the voltage converter being configured to charge the capacitor by boosting an output voltage of the auxiliary power source; and
    a controller configured to, before closing the relay:
        set a target voltage based on a measurement value of the first voltage sensor;
        control the voltage converter for a difference between the target voltage and a control voltage measured by the second or third voltage sensor to fall within a predetermined tolerance;
        acquire the measurement value of the first voltage sensor again as a verification voltage when the difference has fallen within the predetermined tolerance; and
        close the relay if a difference between the control voltage and the verification voltage is within the predetermined tolerance.

2. The power supply system of claim 1, wherein the controller is configured to maintain the voltage converter for the control voltage to match with the target voltage after the difference between the control voltage and the target voltage has fallen within the predetermined tolerance.

3. The power supply system of claim 1, wherein the control voltage is measured by the third voltage sensor.

* * * * *